US012596705B2

(12) United States Patent
Nadeau et al.

(10) Patent No.: US 12,596,705 B2
(45) Date of Patent: Apr. 7, 2026

(54) CHANGE CONTROL AND VERSION MANAGEMENT OF DATA

(71) Applicant: Dremio Corporation, Santa Clara, CA (US)

(72) Inventors: Jacques Claude Nadeau, Santa Clara, CA (US); Ryan Murray, Bavaria (DE); Robert Stupp, Cologne (DE); Thomas W. Fry, Bedford, NH (US)

(73) Assignee: Dremio Corporation, Santa Clara, CA (US)

( * ) Notice: Subject to any disclaimer, the term of this patent is extended or adjusted under 35 U.S.C. 154(b) by 0 days.

(21) Appl. No.: 17/936,086

(22) Filed: Sep. 28, 2022

(65) Prior Publication Data

US 2023/0098227 A1     Mar. 30, 2023

Related U.S. Application Data

(60) Provisional application No. 63/250,030, filed on Sep. 29, 2021.

(51) Int. Cl.
*G06F 16/23* (2019.01)
*G06F 16/25* (2019.01)

(52) U.S. Cl.
CPC ...... *G06F 16/2379* (2019.01); *G06F 16/2358* (2019.01); *G06F 16/254* (2019.01)

(58) Field of Classification Search
CPC . G06F 16/2379; G06F 16/2358; G06F 16/254
See application file for complete search history.

(56) References Cited

U.S. PATENT DOCUMENTS

| | | | | | |
|---|---|---|---|---|---|
| 6,181,336 | B1 * | 1/2001 | Chiu | ...................... | G06T 1/00 |
| | | | | | 715/736 |
| 8,677,083 | B1 * | 3/2014 | McHugh | ............ | G06F 21/6209 |
| | | | | | 711/100 |
| 2013/0191338 | A1 * | 7/2013 | Ducott, III | ......... | G06F 16/2308 |
| | | | | | 707/634 |
| 2013/0326215 | A1 * | 12/2013 | Leggette | .............. | G06F 21/604 |
| | | | | | 726/10 |
| 2014/0297592 | A1 * | 10/2014 | Ohtake | .................... | G06F 8/71 |
| | | | | | 707/638 |
| 2016/0092526 | A1 * | 3/2016 | Kothari | ................... | G06F 16/27 |
| | | | | | 707/602 |
| 2017/0132303 | A1 * | 5/2017 | Dobinson | .............. | G06F 16/27 |
| 2020/0053176 | A1 * | 2/2020 | Jimenez Salgado | .... | G06F 9/543 |

(Continued)

*Primary Examiner* — Mohammad S Rostami
(74) *Attorney, Agent, or Firm* — Thomas | Horstemeyer, LLP

(57) ABSTRACT

A system performs a distributed version control on a data lake. A change to the data lake can be performed within a single atomic commit that defines a set of changes. Commits are built on top of each other and describe incremental changes, which creates a sequence of atomic commits that defines a history of changes. The commits can be identified by hash values, and branches can be defined to refer to commits. A new commit updates a branch head reference to the new commit so that the branch head always refers to the latest version of a chain of commits in the branch. The system can create tags that define, for example, a release version and can merge source commits onto target commits including merging the head of one branch onto the head of another branch.

20 Claims, 6 Drawing Sheets

```
+-- --- --- --- --- --- --- --- --- --- --+     +-- --- --- --- --- --- --- --- --- --- --- --- --+
|   previous commit   |  --<--   |          current commit          |
+-- --- --- --- --- --- --- --- --- --- --+     +-- --- --- --- --- --- --- --- --- --- --- --- --+
     |              |                         |             |              |
   (add)          (add)                       |             |            (add)
     |              |                         |             |              |
+-------+     +-------+                   +-------+     +-------+     +-------+
| data  |     | data  |                   | data  |     | data  |     | data  |
| file  |     | file  |                   | file  |     | file  |     | file  |
| #1    |     | #2    |                   | #1    |     | #2    |     | #3    |
|     _ |     |     _ |                   |     _ |     |     _ |     |     _ |
|    /  |     |    /  |                   |    /  |     |    /  |     |    /  |
|_/     |     |_/     |                   |_/     |     |_/     |     |_/     |
```

(56)  References Cited

U.S. PATENT DOCUMENTS

| | | | |
|---|---|---|---|
| 2021/0073736 A1* | 3/2021 | Alawi | G06Q 10/06315 |
| 2021/0097061 A1* | 4/2021 | Amihod | G06F 16/2322 |
| 2022/0253297 A1* | 8/2022 | Wallis | G06F 8/65 |

\* cited by examiner

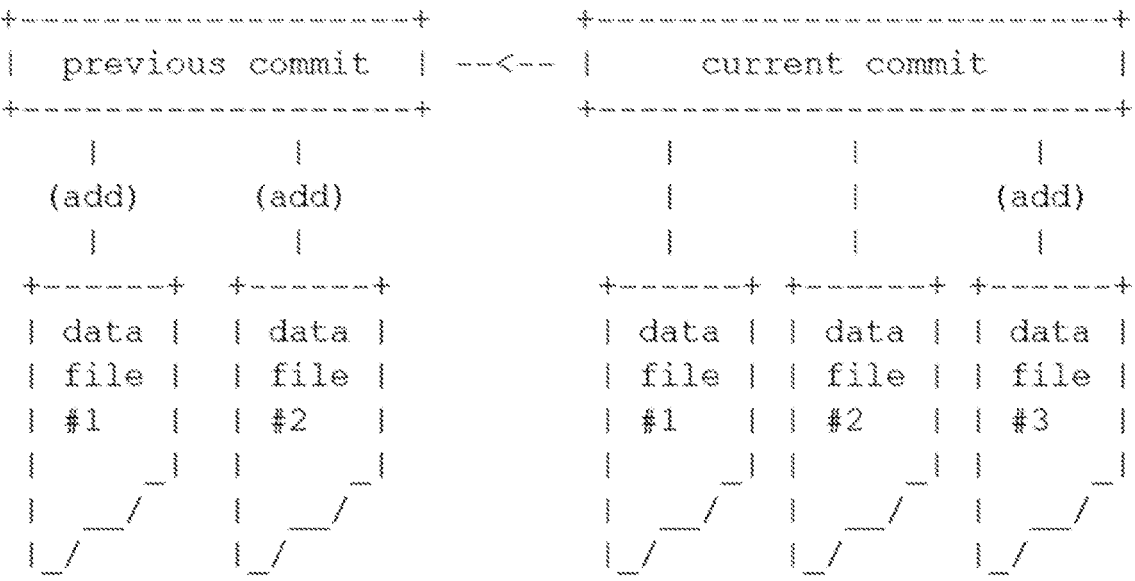
FIG. 1
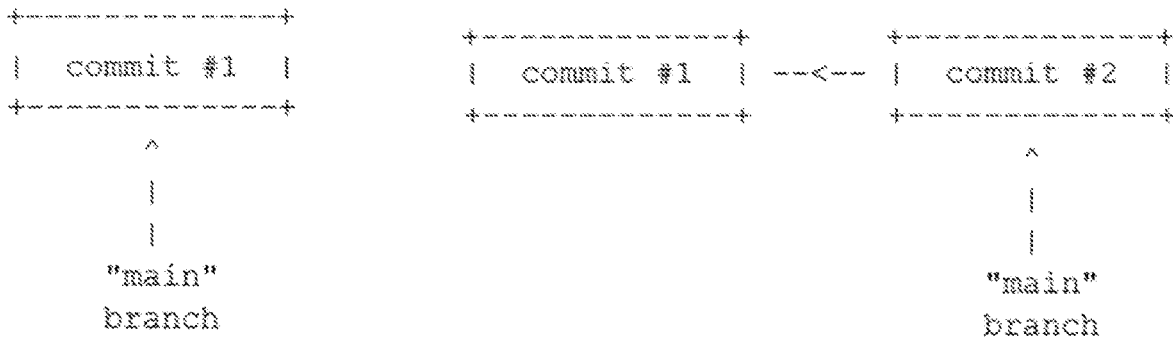
FIG. 2A                    FIG. 2B

```
> SHOW BRANCHES branch_name    commit_hash    commit_timestamp user_name
        commits_ahead    commits_behind
--------    -----------    ---------------- ---------
        -------------    --------------
branch_a    xxxxx    2020-01-01 01:01:01  bob    12    0
branch_b    xxxxxx   2020-01-02 01:01:01  sue    14    0
```

*FIG. 5*

CHANGE CONTROL AND VERSION MANAGEMENT OF DATA

CROSS-REFERENCE TO RELATED APPLICATION

This application claims priority to U.S. provisional patent application Ser. No. 63/250,030 filed Sep. 29, 2021 and titled "Change control and version management of data," which is incorporated herein in its entirety by this reference thereto.

TECHNICAL FIELD

The disclosed teachings generally relate to a data system or related platform.

BACKGROUND

With the advent of big data, organizations can cost-effectively store significantly larger volumes of data than was previously possible in largescale data lakes. However, traditional tools are unable to effectively manage the larger volumes of data due to cost and technology limitations. As a result, to analyze largescale datasets, organizations utilize tools that provide users with inefficient or inadequate access to data stored in a data lake.

BRIEF DESCRIPTION OF THE DRAWINGS

Detailed descriptions of implementations of the present invention will be described and explained through the use of the accompanying drawings.

FIG. 1 illustrates an example of two versions of a data lake each defined by an individual commit, plus how commits build on top of a prior commit.

FIGS. 2A-2B illustrates changes to tables grouped under a single commit.

FIG. 5 illustrates an output for a SHOW BRANCHES command.

Figures 3A, 3B, 3C:
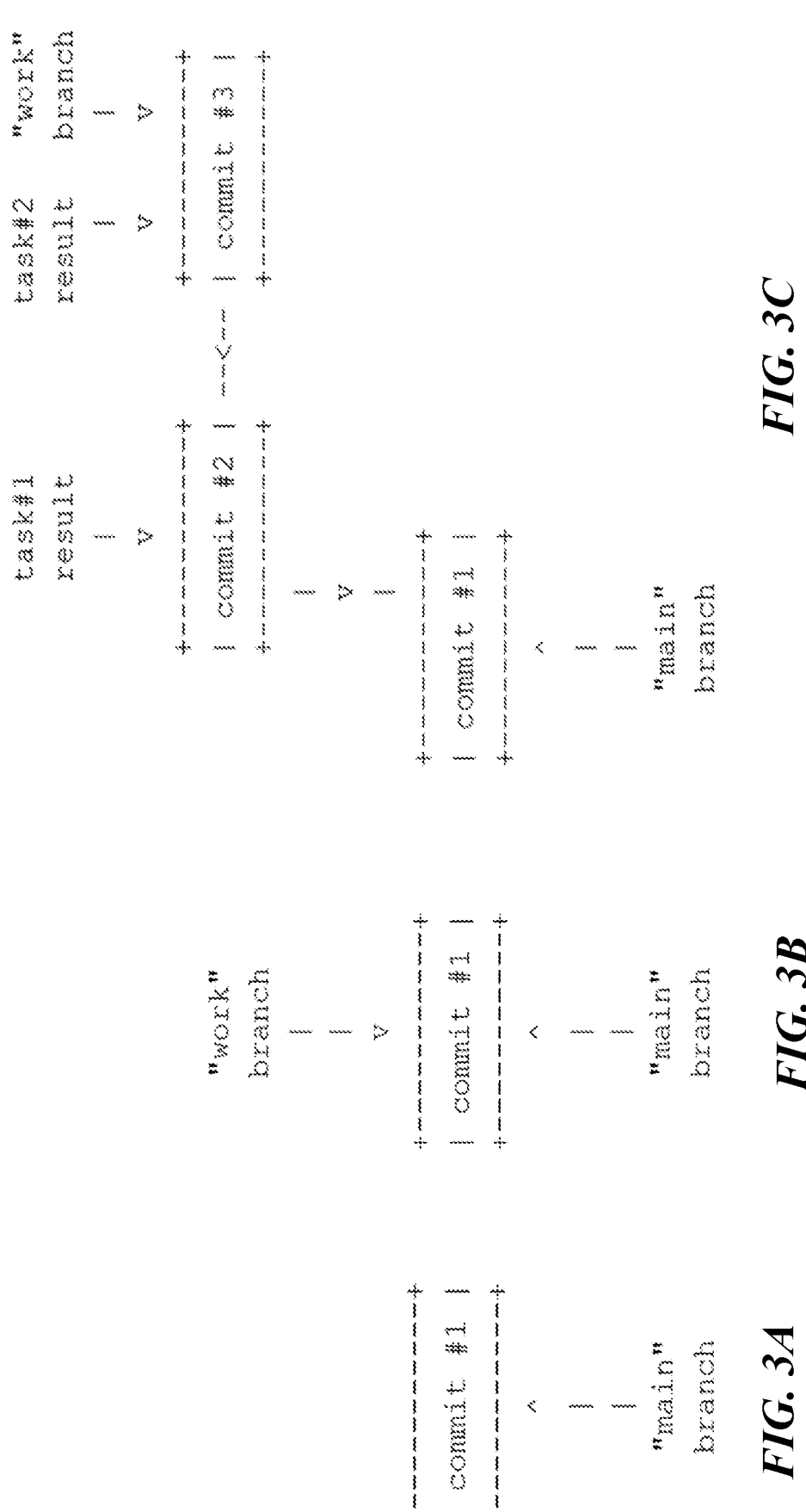
FIG. 3A-3C illustrates an example of branches and merges.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

With the advent of data lakes, organizations are able to cost effectively store significantly larger amounts of data than previously possible with traditional databases and enterprise data warehouses. However, when migrating from a traditional database environment to a data lake, some core functionality that is synonymous with databases is lost. Specifically, ACID (atomicity, consistency, isolation, durability) semantics and transactional consistency are lost. As used herein, "ACID" can refer to a set of properties of database transactions intended to guarantee data validity despite errors, power failures, or other mishaps. In the context of databases, a sequence of database operations that satisfies the ACID properties (which can be perceived as a single logical operation on the data) is called a transaction. Database transactions enable multiple different updates to be implemented in a single atomic logical transaction so that changes are consistent. A classic example is debiting one account while crediting another account in a single transaction.

However, data lakes do not offer ACID transactional consistency and data teams often struggle with how to provide a consistent view of data as changes are made. Data lakes are comprised of multiple files stored on cloud or object storage systems, and updates to data can involve adding, removing, or updating multiple different files throughout a storage system or even across multiple storage systems. Without the ability to make these updates to different files in storage in a transactionally consistent manner users are exposed to reading inconsistent results when an update is only partially performed. As a result, data teams are forced to either live with these inconsistencies or resort to complicated workflows to try and manage or mask these effects.

Conversely, even when using traditional databases but in modern large scale and multi-system environments, data teams still struggle with maintaining consistency and dealing with change management. This is due to databases offering consistency and ACID semantics, but only for a single user modifying data on a single system at a time (in a single session). In modern environments change management processes are often developed through large multi-step ETL (extract, transform, load) flows on multiple different systems, such as nightly ETL batch jobs, and although databases can support transactional consistency for a single user on a single system, the entire change management process as a whole cannot be implemented in a consistent manner with ACID guarantees. As a result, data teams operating in modern large-scale environments often face the same data change management challenges when using traditional databases as when using modern data lakes.

When looking at industry best practices for change management on large scale systems involving multiple teams and tools, GitHub with git version control for software code is one example. Prior to the introduction of git (and other similar version control systems), application development teams writing software struggled with version control. Developers struggled with change management aspects such as developing multiple different and separate features on a single application but in isolation from each other. Developers also struggled with sharing different versions of a code base that was still in development for review and improvement but not yet ready. For decades developers struggled with these and many other challenges.

Git is one method to manage versions of application code, and application development teams use git to version software code bases due to its characteristics and benefits.

There are several concepts that can significantly improve change management and version control. Examples of the concepts includes:

Commits, every change is implemented as a single atomic operation that can span multiple files at once and builds on any pre-existing version of the entire code base.

Branches, define isolated environments of the entire code base to work on.

Tags, provide easy to define human readable names for specific versions of historical importance, such as release versions.

Merges, provide the ability to atomically apply all of the changes created in one branch or version of the code base (such as a feature branch) and apply those changes to another version of the code base (such as the mainline branch).

A combination of these concepts can transform how application developers could collaborate on a large, and shared code base across a large team. For example, with git it became trivial for a single developer or small team to quickly and easily define an isolated environment (a branch) to develop changes for a specific feature within a larger application. This isolated environment could then be maintained on its own development schedule separate from the release cycle of other features and even the main application, while changes to the main application could be applied to their isolated environment in order to keep up to date with the current code base. As such, different features could be developed on their own independent schedules with their own cadences.

Branches provide a mechanism for teams to collaborate, provide feedback on, iterate, improve and verify changes. Developers can share branches with a single feature with other teams for review without disrupting the main code base or other development activities. Any changes required can be applied within the feature branch in isolation from other development efforts. Importantly, a feature could be tested and verified prior to integrating with the rest of a code base. After verification one can apply the feature branch's changes to the main code base since the feature branch was kept up to date with other changes applied to the main branch throughout the development cycle.

These characteristics transform how application development teams can collaborate with each other, and the result was increased adoption become the de facto standard for change control and version management of software code. Teams started to apply git version control to other efforts, such as configuration file management, devops and more. Today git is prevalent throughout multiple technology disciplines and over a wide variety of use cases.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Distributed Versioning for the Data Tier

Despite the fact that git has become the de facto standard in engineering and IT departments for version control, there is still one major area that git style version control is not used, and that is data (e.g., data lakes and data warehouses). Although databases and enterprise data warehouses support transactional consistency, they do not support version control. Additionally, the ANSI (American National Standards Institute) SQL (Structured Query Language) standard which defines the industry standard for SQL commands and behavior to maintain consistency across different systems, does not incorporate version control as a concept.

The disclosed technology (also referred to herein as "Project Nessie" or "Nessie") brings distributed version control to the data tier and to data lakes so that data itself can benefit from the same best practices and advantages that git brought to software code and application development. Furthermore, Nessie provides semantics in a manner that is compatible and easy to use with existing SQL tools, so that data engineers can utilize their existing SQL clients and tools while gaining access to distributed version control of data. By implementing distributed version control on data lakes which are built on large scale-out storage systems, data engineers gain access to distributed version control on datasets of any sized data and even through the petabyte scale.

Nessie defines a catalog for the data lake in a similar manner as other data lake catalogs such as the Apache Hive Metastore or AWS Glue. Then on top of the data lake catalog Nessie implements core concepts of distributed version control including:

Commits

All changes to the data lake are performed within a single atomic commit that defines a set of changes to the data lake. Changes are any modification to the data lake including adding data to datasets, creating datasets, modifying datasets, etc.

Commits always built on top of another commit and describe the incremental changes to apply. This creates a sequence of atomic commits that defines a full and complete history of all changes Commit references define a version of the entire data lake and that spans all tables, views and any other object that is part of the data lake.

Hashes

Commits are identified by a hash which is used as the identifier (ID) of the commit Branches Branches are named references to a commit. Each new commit updates the branch head reference to the new commit so that the branch head always refers to the latest version of a chain of commits in the branch.

Multiple branches can exist, each with a reference to a different commit point. This enables multiple versions of the data lake to be defined at the same time and fully isolates each version.

Tags

Named references to a commit point that remain static and do not automatically change (as with the branch reference). Tags create a static reference point for the data lake, such as defining the release version for a given day.

Merges

Merges combine two separate commits, a source commit onto a target commit, typically the head of one branch onto the head of another branch.

Merges enable the changes created in an isolated development environment or branch to be applied atomically onto the production environment.

A difference for Nessie merges from typical git merges, is that in Nessie the changes in the source branch which are a series of commits, are replayed on top of the target branch in the order that they were implemented on the source branch.

Commits and Transactions

Data in data lakes is stored within numerous immutable data files, where data files both define the schema of data (e.g., columns, names, and types) and contain user table data. A single logical table (for example a customers table or an orders table) consists of many data files typically organized with data files relating to a common table organized within a common directory structure.

Data files can be added, removed, or replaced from the set of files that define a specific table. Changes to data files can add data to a table, remove or update data within a table, or redefine the tables' schema, including adding or removing columns, changing schema types, etc.

The number of tables and amount of data that can be stored in data lakes is massive, with hundreds of thousands or millions of individual tables and data volumes of terabyte to petabyte scale. Managing this volume of data and data files while keeping track of changes to the data lake in a transactionally consistent manner is a core capability of Nessie and is achieved through efficient handling of commits and incremental changes on top of existing commits.

In the disclosed technology, the state of the entire data lake can be defined by a single Nessie commit. Every commit in Nessie (except for the initial commit) has a reference to a single predecessor commit, which defines the previous "version" of the data lake, and includes incremental changes on top of the predecessor commit. Each Nessie commit references, via metadata, all of the data files that comprise the current state of the data lake for a given version of the data lake.

FIG. 1 illustrates an example of two versions of the data lake, each defined by an individual Nessie commit, plus how commits aggregate on (e.g., build on top of) a prior commit. In the first commit two data files are added and the data lake at that commit point comprises of data files #1 and #2. In the second commit a new version of the data lake is defined which adds data file #3 to the previous two files.

Data files can represent table data, schema information, catalog information or any other concept that defines the state of a data lake. Since files are immutable each commit point is preserved and can be independently referenced to access that version of the data lake at that specific point in time.

Transactions in Nessie are achieved by creating a new commit point or reference on top of an existing commit point. Each commit defines a set of changes to the data lake that are applied as a single atomic operation in a transitionally consistent manner. Whether the change is a "small" change such as adding a single file as in FIG. 1, or the change is a "large" change consisting of millions of files over petabytes of data and redefining a significant number of tables, a single commit always represents and defines a single transaction in Nessie.

Branches

In Nessie, a branch is a reference to the latest or most current version of a chain of commits. In the example illustrated in FIG. 2 there is a single branch named "main" with a single commit as shown in 2A.

As shown in 2B, when a "main" branch is modified the following two changes are performed:
1. A new commit #2 is created, which references commit #1 as its predecessor and includes the desired incremental changes to the data lake
2. The named reference "main" is updated to point to the new commit #2

The version of the data lake to use can be referenced by commit #1 or commit #2, which provide static and immutable references to a specific version of the data lake. The version of the data lake to reference can also be branch main which is a reference that is continuously updated to point to the latest version of that chain of commits. This provides a single reference which always points to the latest version of the data lake.

Multiple Branches and Merges

The example illustrated in FIGS. 2A and 2B works well if all changes to all tables can be grouped under a single commit. However, in modern data lake architectures computational work is distributed across many separate systems and procedures. For example, data may be ingested from multiple difference sources, there may be several layers of business and security logic used to transform new data and materializations may be created on top of newly transformed data to optimize read access.

Each of these individual tasks create new commit points, but the sum of all tasks distributed across many systems represents the consistent state to publish. If every task was committed onto the "main" branch, the "main" branch would be inconsistent until all tasks were completed. Additionally, if an intermediate step failed, it would be hard to rollback changes.

These issues are not specific to just data lakes, databases and enterprise data warehouses also struggle with providing a consistent view of data when changes are performed in a distributed manner across multiple different tools and processes.

To solve these challenges, Nessie essentially enables multiple branches where each branch effectively defines a separate chain of commits. By using multiple branches, changes to the data lake can be implemented within separate "work" branches. With a "work" branch multiple different tools and procedures can update the data lake but do so within the isolated "work" branch environment. After all changes are complete and verified, changes on the "work" branch can be applied in a single atomic transaction onto the "main" production branch.

The sequence illustrated in FIGS. 3A through 3C provides an example of multiple branches and merges. The data lake in this example starts in 3A with a single "main" branch consisting of a single commit.

At 3B, to implement changes in an isolated environment first a new "work" branch is created by forking from the current "main" branch. After forking both the "main" branch and the "work" branch reference the same commit point because no actual data changes have been made and both branches reference the same version of the data lake.

Next at 3C, a sequence of updates can be applied to the "work" branch. In this example two new commits are created, commit #2 and commit #3. Additionally, the "work" branch reference continues to move ahead and point to the most recent version of the chain of commits along the "work" branch chain of commits. Since changes were only applied to the "work" branch chain of commits the "main" branch remains untouched and continues to reference the same original version of the data lake. In this manner all changes are performed in an isolated environment from the "main" branch. This method can easily be used to include thousands of commits by many different systems onto the "work" branch.

After all changes required have been applied, the "work" branch can be merged onto the "main" branch. The task of merging replays all commits on the "work" branch from the fork point onto the "main" branch within a single new commit. This new commit #4 builds on the chain of commits for the "main" branch. After the merge is complete the "main" branch head reference moves forward to the new commit.

Figure 4:
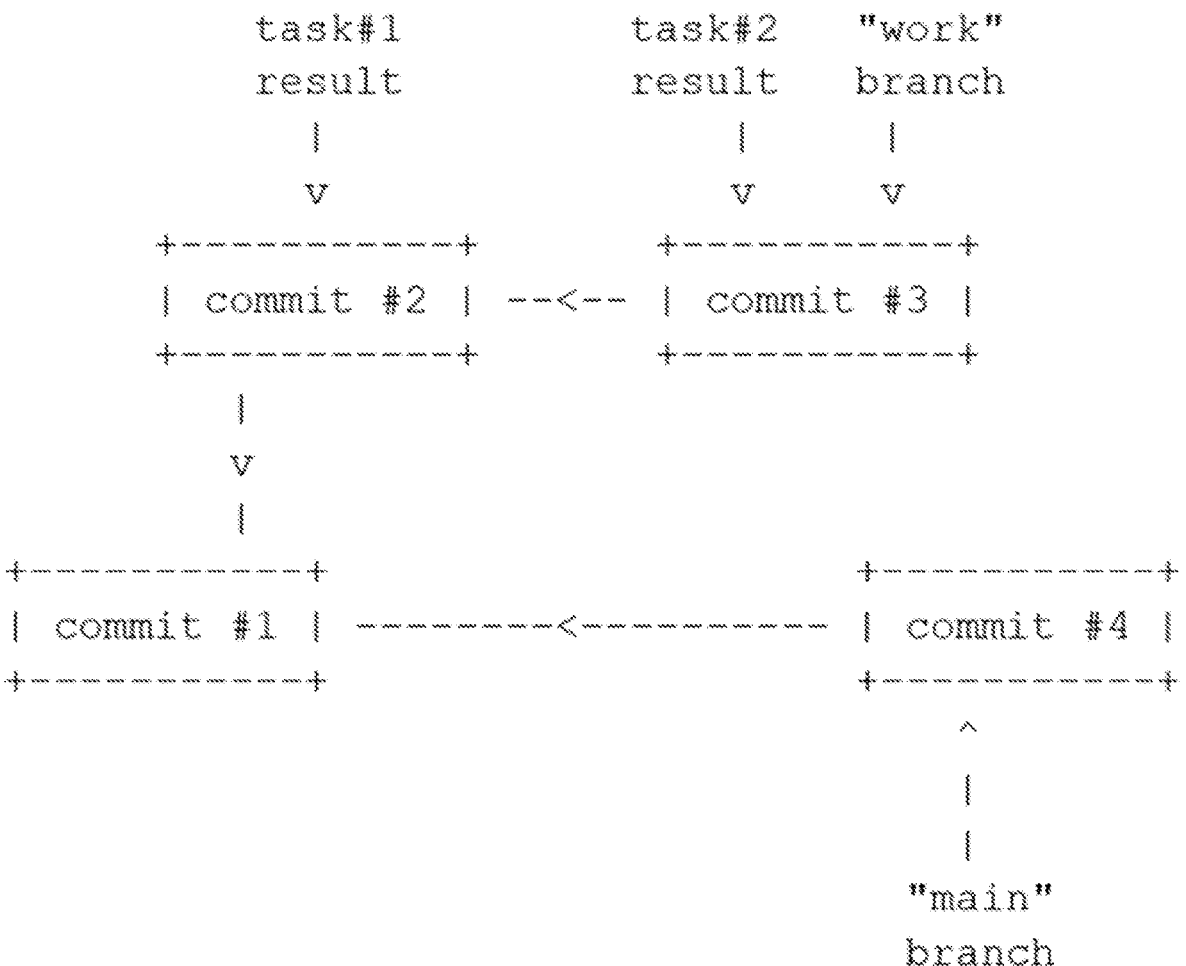
FIG. 4 illustrates a merge of commits.

An important difference between git and Nessie is that, unlike standard git and merge-commits, Nessie commits only ever have a single parent or predecessor. Nessie merge operations technically work differently from git in that changes from the source branch are replayed on top of the target branch. In the example illustrated in FIG. 4, the change operations in commit #2 and #3 are replayed on top of commit #1 to create commit #4.

At this point all user references to the "main" branch will see the changes from the development "work" branch, and those changes will be visible within a single atomic transaction. This form of change management enables all of the benefits and capabilities git provides for software code, but for entire data lakes at any scale.

Commit Metadata

In addition to tracking data file changes at each commit, every Nessie commit has a set of attributes to capture helpful metadata, such as the commit author, when the commit was created, a user generated description, etc.

The commit attributes available include:

Commit timestamp—When the commit was recorded in Nessie

Author—The identity that created the commit point

Author timestamp—When a change was implemented. Note this can be different from the commit timestamp and is used to track when a set of changes are "live". This is useful for enabling Time Travel queries after merges from another branch.

Author—The identity that authored the change. Same as author timestamp can be different from the identity that recorded the commit, useful for tracking which identiy wrote the change after a merge.

Summary—A short user generated one-line summary of the changes.

Description—A longer user generated description of the changes.

Tags

Tags are user created named references to a single commit point. Unlike a branch reference which continues to move forward, tags are static references that point to a historic and immutable version of the data lake. Tags are similar to commit IDs, however instead of being a long hash string, they are a human readable reference, such as "production-release-2021-08-02". Tags are useful to reference a specific commit point with a human readable and rememberable name.

Advantages of the Disclosed Technology

By enabling distributed version control to the data tier and data lakes, Nessie enables all of the benefits that git provided to software code and application development, but to the data lake and data in general. This provides numerous benefits to data teams managing a data lake, including the following.

Reproducibility

Since every Nessie commit references an immutable snapshot of the entire data lake, it is possible to not only access historical data from any point in time, but also to reproduce any previous query or operation that was run in the past and regenerate identical results.

Reproducibility enables numerous use cases such as auditing, verifying machine learning models and more. For example, the ability to regenerate identical results as a query generated at an earlier point in time is extremely useful to test and verify machine learning (ML) models. Analysts design and train ML models to perform many different types of tasks and automate decision making over a variety of fields. For example, ML models are trained to make financial buy/sell decisions, identity fraudulent transactions, approve new credit, etc.

Often developers need to investigate "why did an ML model make decision X at this point in time in the past". In order to answer that question it is necessary to be able to not only access data that was present at that point in time, but to be able to re-execute the same ML model on the same data in order to generate the same results, this is necessary to see and test why a certain decision was made. With Nessie it is possible to easily switch to historical points in time by referencing prior commits, and then re-execute the same ML operations to re-generate identical results to glean insights into why certain decisions were made previously by the ML model in question. This ability can be used to back test new models and improve. Similarly, an analyst can use the same technique to replay a Business Intelligence dashboard on a previous point in time.

Verification

With Nessie branches it is possible to easily verify data changes prior to exposing changes to users. Without it, data teams are forced to either resort to numerous manual tricks to try to identify issues prior to publishing changes, or simply to publish changes and then test afterwards and hope no issues exist.

When using Nessie, since all data changes can be made in an isolated branch environment, data changes do not impact users until branches are merged. This provides a window of opportunity to test and verify data changes after they are made in a working branch, but before they are published to users on a main branch. The benefit of this for operations teams cannot be overstated. Most operational teams constantly struggle with identifying and fixing data issues that were inadvertently introduced. However, with Nessie branches it is possible to make all changes within an isolated environment, and then fully test and verify the correctness of that environment prior to publishing. The ability to verify data changes is one of the primary motivating factors for new users to adopt Nessie.

Consistency

In modern environments, data changes are made by numerous different tools, systems and processes. This is true not just for large scale data lakes, but even in traditional database and enterprise data warehouse environments as well. When changes are created by different tools and processes it has not been possible to implement changes in a consistent manner, because changes are completed in a non-transactional manner between systems. For example, the first procedure writes its changes, then the next procedure writes its changes, and so on. The issue is users are exposed to intermediate results after the overall process has started, but before the last step completes.

Nessie branches enables numerous multi-step changes, even changes that span different systems and tools, to be written to the main production version of data in a single atomic transaction. This ensures that users always see a consistent version of data and are never exposed to intermediate or in-process results. In addition, a SQL engine can utilize temporary Nessie branches behind the scenes to implement standard SQL transactions (BEGIN/COMMIT).

Experimentation

Since Nessie branches are simply pointers to existing Nessie commits, the operations to create and delete branches is both extremely fast and effectively free. This reduces the barrier to creating branches and enables developers to create branches for any purpose including experimentation, even if they expect to simply throw away their work afterwards.

With Nessie it is trivial and cost effective to create a new branch as a private version of the whole data lake, make changes simply to test and try out, and then delete or throw away the branch when complete. Doing so enables data teams to improve the data lake and discover new use cases because it is risk free to try out and explore changes and assess their benefit.

Responsive Error Correction

By maintaining a complete record of the historical state of the data lake, it is trivial to rollback or undo changes to a prior point in time that is known to be valid. This ability enables data teams to immediately recover from mistakes when they are identified or applications break so that users can be up and running on known good data, providing time for the data team to investigate the issue after rolling back and without being in a production down scenario.

The Nessie project can be used as a metastore for query/ data processing engines such as Dremio, Apacahe Spark, Presto, Trino and Flink. It is intended to be used as an alternative to Hive Metastore or AWS Glue Catalog, which are simple, flat catalogs with no support for versioning or branching. At the individual table level, Nessie integrates with table formats such as Apache Iceberg and Delta Lake. Nessie stores pointers to the manifests of such tables.

Commit Throughput Acceleration

Git was originally designed to support application code changes made by software development teams. Although a large team of developers can create many commits a day, the overall throughput is typically less than 1 commit per second.

However, the throughput of changes made to any data lake or even traditional database is likely to exceed one change per second. As a result, Nessie required fundamental architectural design changes from git in order to handle the transaction throughput required by a large-scale data lake environment. The following approach was developed in order to handle hundreds of commits per second (and even beyond 2,000 commits per second) on today's standard computing hardware.

For backend storage, Nessie supports both non-transactional key-value stores and transactional databases (relational). The goal of the implementation is to spread keys as much as possible, so data can be evenly distributed, and to keep the number of operations against a backend storage database low to reduce operation-time. Contention by itself is not avoidable, because operations against Nessie are guaranteed to be atomic and consistent, but by reducing contention Nessie can scale the throughput of commits per second much higher than traditional git.

Key-value stores are designed to be scale-out and able to scale to the sizes required for large data lakes, however they are not transactional in nature. Most key-value stores support atomic CAS (compare-and-swap) operations against a single row/record, but atomic and conditional updates to multiple rows/records is either not supported at all or extremely slow (too slow for a Nessie commit operation).

For table formats such as Apache Iceberg Nessie needs to track both the pointer to the Iceberg "Table Metadata" which is tracked as "global-state" and the Iceberg snapshot-ID which is tracked per Nessie-named-reference. For Nessie-commits, which are atomic, this means that Nessie has to update both the global-state and the on-reference-state for the Iceberg table. While this is not an issue with a relational/ transactional databases, it is an issue in a key-value store. Nessie solves this with a single "global-pointer", which is updated using a CAS operation.

Nessie-commits (and similar operations like "transplant" and "merge") optimistically write all the data to the commit-log and global-state-log first and then try to perform the CAS-operation against the global-pointer. If the CAS-operation succeeds, the Nessie-commit operation has succeeded. If the CAS-operation fails, all optimistically written rows are deleted and the whole Nessie-commit process is retried.

The logical data model shared by all non-transactional database adapters consists of four entities:

Global-pointer a single "table row" that points to the current global-state-log and all HEADs for all named references. Consistent updates are guaranteed via a CAS operation on this entity comparing the HEAD of the global-state-log.

Commit-log contains all commit-log-entries, identified by a deterministic hash. This is the same as for transactional databases.

Global-state-log contains all changes to the global state for content-types that do require global state (currently Apache Iceberg). The row-keys are random IDs.

Key-lists acts as an "overflow" for large key-lists that do not fit entirely into a single commit-log's embedded-key-list.

The implementation can perform many hundred to many thousand commits per second, depending on the performance of the backend database and the characteristics of the use-case. The two important factors are:

Concurrent commits against different branches are "faster" than concurrent commits against a single branch.

Concurrent commits against the same table (think: Iceberg or Deltalake table) are slower than concurrent commits against different tables.

Privileges

Unlike standard git for software code, Nessie is a database catalog referencing tables and views. All databases support the ability to control which user identities can access which database objects, and similar to any database Nessie needs to protect and control access to data. In standard ANSI SQL databases access control is implemented by enabling fine grained privileges to be granted to any user or group identity, such as select privileges to read data, insert privileges to add data, update privileges to modify data, and so on.

As a database catalog, Nessie also contains standard SQL privileges on objects (tables, views, etc.). However, having multiple different branches or versions introduces another layer of complexity. With Nessie there are multiple versions of the same object, for example a sales table may exist in both the production main branch and the in-development etl branch. Most data teams need to grant access to the production version of the sales table to users such as sales managers, however they will simultaneously need to block access to the in-development version of the sales table in the etl branch since data has not been verified or completed yet.

Nessie could treat every version of an object as a separate item to apply privileges on, for example to allow separate privileges to be granted to the sales table in the main branch and to the sales table in the etl branch. However, doing so introduces numerous complexities and issues for users to manage privileges, such as:

Privilege management for branches would be extremely cumbersome. For example when a new branch is created users would need to reset the privileges for all tables in the entire data lake for the new branch, in order to either restrict users from accessing tables in the new branch or to grant the data team extra access to objects in the new branch.

Branch merge operations would be indeterminate. For example, if a new table is created in a development branch and then the development branch is merged to branch since they were not granted access to the development branch which prevents access to that version even though they were granted privilege to the sales data tables.

To support this, in additional to standard ANSI SQL privileges, ANSI SQL the following privileges shown in TABLE I

TABLE I

| Privilege | Targets | Actions allowed |
|---|---|---|
| USAGE | Nessie Branch | Required to access and perform any operation on a specific branch including reading from the branch<br>Merge onto branch<br>By default every user has access to the 'main' branch<br>USAGE the 'main' branch can be offered by default<br>Additional USAGE grants are required to access all custom branches<br>Note: USAGE on a branch grants access to all historical commits within the branch |
| OWNERSHIP | Nessie Branch | Perform the following actions on the branch:<br>Delete the branch<br>Modify Grants on branch |
| CREATE BRANCH | Nessie Repository | Create a new branch |
| MODIFY | Nessie Repository | Edit/view Nessie configuration settings |
| MONITOR | Nessie Repository | View Nessie configuration | the production branch, what privileges should be created in the production branch (which likely will be different from the development branch).

Privilege management complexity would grow exponentially. Consider a data lake with 10,000 tables needing privileges. If 10,000 branches are created over time that leads to 100,000,000 individual objects that privileges can be configured on.

To avoid these and other complexities Nessie takes a unique approach to defining privileges on objects. In Nessie there are two distinct levels of privileges:

1. Privileges on objects—These are standard privileges (e.g., ANSI SQL) on tables, views, etc. such as SELECT access or INSERT access on individual objects. These privileges on an object are global and apply to all versions of the object in any branch.

2. Privileges on branches—This is unique to Nessie. In Nessie separate privileges are granted to be able to use each branch.

To access a specific version of an object in a branch, the user needs the appropriate privilege on the object itself (#1 above) plus the privilege to use the branch for the version of the object being accessed (#2 above). In this manner which users can access which objects (tables, views, etc.) can be managed independently off which users can access specific versions of the data lake (e.g., the production version or branch vs. a development version or branch).

The disclosed method greatly reduces complexity in security management and makes privilege management seamless for normal usage. For example, suppose an organization wanted a sales team to be able to access sales data that is published to production, but not be able to access the same sales data while it is in development and instead restrict the sales team to only see production data. The organization could grant the sales team permission to access the sales data tables plus permission to use the production branch, but not grant the sales team permission to access development branches. In this configuration, the sales team would be able to access sales data tables in the production environment because they were granted both privileges on the sales tables plus privilege to use the production branch, but they would not be able to access sales data tables in the development SQL Commands SQL is the de-facto standard language for databases and as a result there exist numerous SQL based client tools that are able to interact with any database through the common SQL standard. Since Nessie provides a Database catalog for the data lake, SQL is also the standard language used by users to interact with the Nessie catalog.

However, since Nessie also introduces distributed version control with git semantics and operations, Nessie needs to expose common git operations through SQL commands in a manner that is consistent with the structure of existing SQL operations in the ANSI standard.

The operations that Nessie can or needs to support through SQL commands includes the following:

The ability to set the default commit context for the SQL session, could be a branch or a historical commit The ability to create, delete or list Nessie branches.

The ability to create, delete or list Nessie tags.

The ability to reference or access tables or views from a different branch or commit context than the current default for the SQL session The ability to merge branches SQL Commands to Set Default Commit Point for SQL Session The following SQL commands are used to manage the branch context for a given SQL session. If the context supports writing, all SQL DML operations are applied to the current branch. Only contexts that refer to the head of a branch are writable and support data modification operations, all other contexts are immutable historical points in time and only support read-only mode.

Read/write mode:

USE BRANCH <branch-name>

Read-only mode—Time Travel reference on a branch:

USE BLANCH <branch-name> [AT/BEFORE <time-stamp>]

Read-only mode—Commit or tag reference:

USE COMMIT <commit-or-tag-name>

SQL Commands to Create, Delete, Edit or List Branches

The following SQL commands are used to manage Nessie operations on branches from within SQL. If the context supports writing all SQL DML operations are applied to the current branch.

Create a new branch based on the current branch or commit context

CREATE BRANCH <branch-name>

Delete a specified branch, if the specified branch is the current SQL session's branch context, the branch context is changed to the default branch for the source.

DROP BRANCH <branch-name>

When a branch is deleted, there could be other active SQL/UI sessions that are using the deleted branch as the current Nessie context. After deletion these sessions are now in an invalid state since their current context refers to a Nessie branch or commit that is no longer available. When this happens all operations error that the current Nessie context selected is invalid and the user needs to select a valid Nessie context.

Merge all changes in <merge-branch> to the current branch context.

MERGE BRANCH <merge-branch-name>

Show all branches that exist

SHOW BRANCHES

Information shown includes:

Branch name

Most recent commit hash

Most recent commit time

User who made the most recent commit

Number of commits the branch is ahead of the default branch

Number of commits the branch is behind of the default branch

Output for the SHOW BRANCHES command following the columns above is illustrated in FIG. 5. The example lists the current commit. This is used to display the branch contexts that are currently set for the session.

SHOW CURRENT CONTEXT

Returns one row per Nessie "repository" configured with the following columns repo_name—VARCHAR—The Nessie repository name context—VARCHAR—The name of the context, either a branch, tag or commit is_branch—BOOLEAN—If the default context is a branch reference, otherwise tag or commit is_read_only—BOOLEAN—If the default context is a read only context, otherwise it supports DML operations.

SQL Commands to Create, Delete and List Tags

Create a new user defined Nessie Tag for a dataset.

CREATE TAG <tag_name>[ON SNAPSHOT <snapshot-id>]

If no snapshot is specified, the tag's timestamp is the current time the SQL command was executed and the snapshot associated with the tag is the current most recent valid snapshot. Alternatively, if a snapshot is provided then the tag's timestamp is the historical timestamp associated with the snapshot.

Once a tag is created on a snapshot the snapshot is protected from automatic deletion by compaction (but not historical aging out).

Delete a user defined Nessie Tag for a dataset.

DROP TAG <tag_name>

Removes the tag associated with the Nessie snapshot. Does not affect the Nessie snapshot or alter the data lake in any other manner. After removal compaction is free to remove the snapshot that was previously protected by the tag.

List the tags that exist

SHOW TAGS

The ability to reference or access tables or views from a different branch or commit context than the current default for the SQL session By default, the Nessie commit context set above is used for all references to tables, views or other objects within a SQL operation. However, other versions can be explicitly referenced using the following semantics.

Reference objects in the SQL session's current context (the default version)

<space-name>.<path>.<table/view-name>

Reference objects in another branch's head context

<space-name>.<path>.<table/view-name>@<branch-name>

Reference objects in the SQL session's current branch context but at an earlier non-head commit point;

<space-name>.<path>.<table/view-name>[AT/BEFORE <timestamp>]

Reference objects in another branch with time travel reference

<space-name>.<path>.<table/view-name>@<branch-name>[AT/BEFORE <timestamp>]

Reference objects at a specific commit or tag point space-name>.<path>.<table/view-name>@<commit_or_tag_name>

Reference objects at a specific tag with a time travel reference

<space-name>.<path>.<table/view-name>@<tag_name>[AT/BEFORE <timestamp>]

Key Differences from Git

The following chart describes key behavioral differences in Nessie from git.

| Dimension | Git | Nessie | Rationale |
|---|---|---|---|
| Speed (commits/sec) | <1 | >2000 | Commit operations in git are expensive and can only be performed serially. As described above Nessie implemented a method to perform commits faster and with a very narrow critical path for new commits, this enables a significant speed up in throughput (# of commits per second) by several orders of magnitude. |
| Scale | 100s of MB | Unconstrained (many PB) | Git repositories are fairly small because they are limited to code text, configuration files, etc. Conversely, Nessie catalogs manage data in scale out data lakes, which grows several orders of magnitude large and often companies have PB of data. |
| History | Thousands | Billions | Nessie supports optional garbage collection of historical commits based on user-defined rules to reduce storage consumption. |
| Committer | Human | Human & Machine | Git was designed for human time: commits happen 100-1000s of times a day, not 100x per second. For Nessie, |

-continued

| Dimension | Git | Nessie | Rationale |
|---|---|---|---|
| | | | data in many systems changes very frequently (especially when you consider a large number of tables). These systems are frequently driven by automated scripts without human interaction. The performance improvements above are required to support the automation common to data lake environments. |
| Objects | Files | Tables & View | Nessie is focused on tracking versions of tables using a well-known set of open table formats. Nessie's capabilities are integrated into the particular properties of these formats. Git is focused on the generalized problem of tracking arbitrary files (buckets of bytes). |

Figure 6:
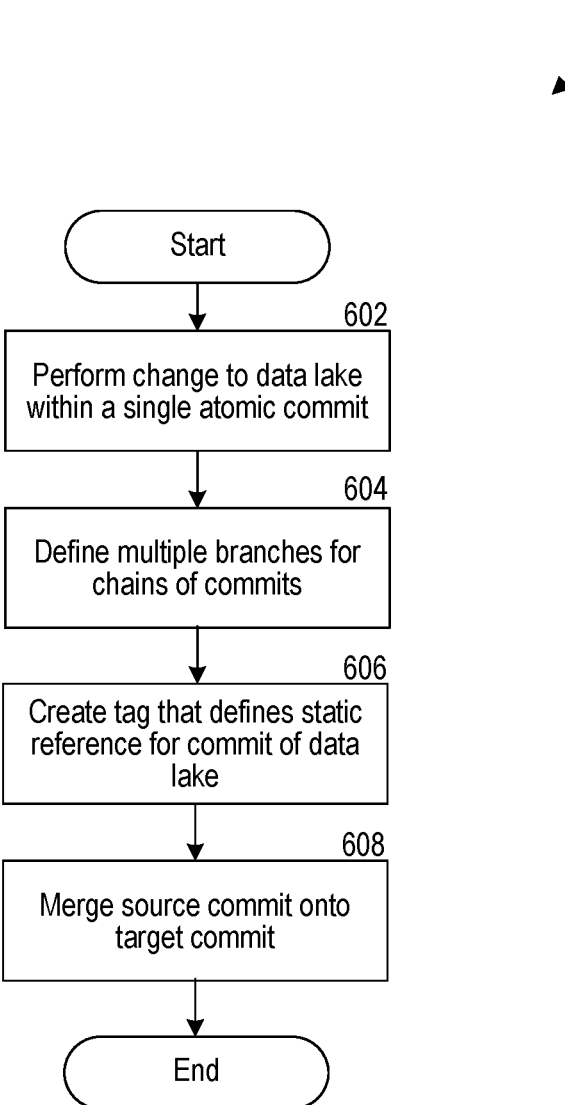
FIG. 6 is a flowchart that illustrates a process for performing distributed version control on a data lake built on a large scale-out storage system.

FIG. 6 is a flowchart that illustrates a process for performing distributed version control on a data lake built on a large scale-out storage system. The process 600 can be performed by a system including at least one hardware processor and at least one non-transitory memory storing instructions, which, when executed by the at least one hardware processor, cause the system to perform the process 600.

At 602, the system can perform a change to the data lake within a single atomic commit that defines a set of changes to the data lake. The change can include a modification to the data lake including adding data to datasets, creating datasets, or modifying datasets. A subsequent commit can be built on top of another commit. The commits represent incremental changes, which can collectively create a sequence of atomic commits that defines a history of changes. Further each commit can be identified by a hash value (e.g., non-human readable string).

At 604, the system defines multiple branches for chains of commits. A branch is a reference to the latest or most current version of the chain of commits. A new commit updates a branch head reference to the new commit so that the branch head always refers to the latest version of a chain of commits in the branch.

At 606, the system creates a tag that defines a static reference for a commit of the data lake. Tags are user created named references to single commit points. Unlike a branch reference which continues to move forward, tags are static references that point to a historic and immutable version of the data lake. Tags are similar to commit IDs, however instead of being a long hash string, they are a human readable reference. As such, the tags are useful to reference a specific commit point with a human readable and rememberable name.

At 608, the system merges a source commit onto a target commit including merging the head of one branch onto the head of another branch. The source branch can include a series of commits that are replayed on top of the target branch in the order on the source branch.

Computer System

Figure 7:
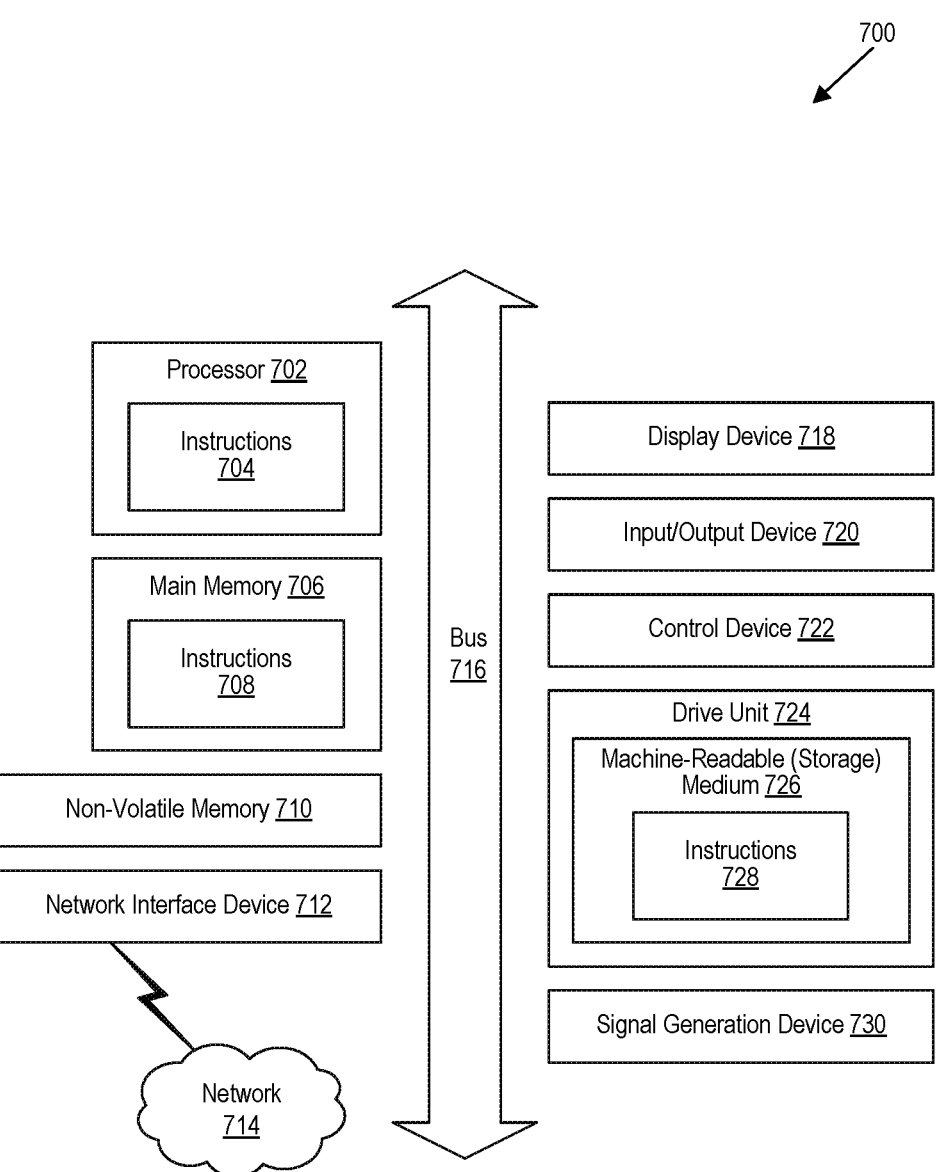
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A non-transitory computer-readable storage medium storing instructions, that, when executed by a processor of a system, cause the system to:
    perform distributed version control on a data lake resident on a scale-out storage system including a change to the data lake within a commit, wherein the commit defines a set of changes to the data lake that are applied as a single atomic operation;

define multiple branches that each correspond to a separate chain of commits for multiple data objects, wherein a new commit updates a head of a branch associated with the new commit;

create an indication that defines a static reference to the commit of the data lake;

merge a source commit onto a target commit including merging a head of one branch onto the head of another branch of the multiple branches;

configure different versions of a particular data object of the multiple data objects to grant different privileges to different entities; and configure each version of the particular data object such that privileges are global across all versions of the particular data object on each branch of the multiple branches, wherein an access to a particular version of the particular data object on a particular branch of the multiple branches requires the grant of privileges on the particular data object and privileges on the particular branch, wherein the privileges on the particular data object apply to all versions of the particular data object on each branch of the multiple branches such that the privileges on the particular data object allow access to new versions of the particular data object on a new branch, and wherein the privileges on the particular branch include privileges to access the particular branch for the particular version of the particular data object.

2. The non-transitory computer-readable storage medium of claim 1, wherein the change includes a modification to the data lake including adding data to a dataset, creating a dataset, or modifying a dataset.

3. The non-transitory computer-readable storage medium of claim 1, wherein a subsequent commit is built on top of another commit and describes an incremental change.

4. The non-transitory computer-readable storage medium of claim 3, wherein the subsequent commit built on top of another commit creates a sequence of atomic commits that define a history of changes.

5. The non-transitory computer-readable storage medium of claim 1, wherein each commit is identified by a hash value.

6. The non-transitory computer-readable storage medium of claim 1, wherein the head of a particular branch refers to a version of a chain of commits in the particular branch.

7. The non-transitory computer-readable storage medium of claim 1, wherein a source branch includes a series of commits that are replayed on top of the target branch in an order on the source branch.

8. The non-transitory computer-readable storage medium of claim 1, wherein each commit, except for an initial commit, has a reference to a single predecessor commit, and wherein each commit defines a previous version of the data lake.

9. The non-transitory computer-readable storage medium of claim 1, wherein each commit references, via metadata, data files that comprise a state of the data lake for a given version of the data lake.

10. The non-transitory computer-readable storage medium of claim 9, wherein the data files include a table data, schema information, catalog information, or another concept that defines the state of the data lake.

11. The non-transitory computer-readable storage medium of claim 9, wherein the data files are immutable, and wherein each commit point is preserved and is independently referenced to access a version of the data lake at a specific point in time.

12. The non-transitory computer-readable storage medium of claim 1 further comprising:

performing a transaction by creating a particular commit point or reference on top of an existing commit point.

13. The non-transitory computer-readable storage medium of claim 1, wherein the data lake is updatable with multiple different tools and procedures within a first branch and wherein changes on the first branch are applied in a single atomic transaction to a second branch.

14. The non-transitory computer-readable storage medium of claim 1, wherein the merged commits enable changes created in an isolated development environment or branch to be applied atomically onto a production environment.

15. A system comprising:

at least one hardware processor; and at least one non-transitory memory storing instructions, which, when executed by the at least one hardware processor, cause the system to:

perform a change to a data lake within a commit, wherein the commit defines a set of changes to the data lake that are applied as a single atomic operation;

define multiple branches that each define a separate chain of commits for multiple data objects, wherein a new commit updates a head of a branch associated with the new commit;

create an indication that defines a static reference to the commit of the data lake;

merge a source commit onto a target commit including merging a head of one branch onto the head of another branch;

configure different versions of a particular data object of the multiple data objects to grant different privileges to different entities; and configure each version of the particular data object such that privileges are global across all versions of the particular data object on each branch of the multiple branches, wherein an access to a particular version of the particular data object on a particular branch of the multiple branches requires the grant of privileges on the particular data object and privileges on the particular branch, wherein the privileges on the particular data object apply to all versions of the particular data object on each branch of the multiple branches such that the privileges on the particular data object allow access to new versions of the particular data object on a new branch, and wherein the privileges on the particular branch include privileges to access the particular branch for the particular version of the particular data object.

16. The system of claim 15, wherein the indication is created by a user and points to a historic and immutable version of the data lake.

17. The system of claim 15, wherein the indication is a human-readable reference.

18. The system of claim 15, wherein each commit is identified by a hash value corresponding to a string that is not human-readable.

19. The system of claim 15, wherein each commit except for an initial commit has a reference to only one predecessor commit, and wherein each commit defines a previous version of the data lake.

20. A method for performing distributed version control on a data lake built on a large scale-out storage system, the method comprising:

performing a change to the data lake within a single atomic commit that defines a set of changes to the data lake, wherein the change includes a modification to the data lake including adding data to a dataset, creating a dataset, or modifying a dataset, wherein a subsequent commit is built on top of another commit and describes incremental changes, which creates a sequence of atomic commits that defines a history of changes, and wherein each commit is identified by a hash value;

defining multiple branches as references to commits for multiple data objects, wherein a new commit updates a branch head reference to the new commit such that that the branch head always refers to a latest version of a chain of commits in the branch;

creating an indication that defines a static reference for the data lake;

merging a source commit onto a target commit including merging the head of one branch onto the head of another branch,

wherein the source branch includes a series of commits that are replayed on top of the target branch in an order on the source branch;

configuring different versions of a particular data object of the multiple data objects to grant different privileges to different entities;

configuring each version of the particular data object such that privileges are global across all versions of the particular data object on each branch of the multiple branches, wherein an access to a particular version of the particular data object on a particular branch of the multiple branches requires the grant of privileges on the particular data object and privileges on a particular branch, wherein the privileges on the particular data object apply to all versions of the particular data object on each branch of the multiple branches such that the privileges on the particular data object allow access to new versions of the particular data object on a new branch, and wherein the privileges on the particular branch include privileges to access the particular branch for the particular version of the particular data object.

* * * * *